United States Patent
Val et al.

(10) Patent No.: US 8,165,990 B2
(45) Date of Patent: Apr. 24, 2012

(54) CONVERSION OF AN APPLICATION DATABASE TO MINIMIZE TIME IN SINGLE-USER ACCESS MODE

(75) Inventors: Kyrylo Val, Seattle, WA (US); Tao Wang, Issaquah, WA (US); David Reinhold, Minnetonka, MN (US); Deepak Kumar, Redmond, WA (US); Satish J. Thomas, Sammamish, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/485,002

(22) Filed: Jun. 15, 2009

(65) Prior Publication Data

US 2010/0318494 A1    Dec. 16, 2010

(51) Int. Cl.
*G06F 7/00* (2006.01)
*G06F 17/00* (2006.01)
(52) U.S. Cl. ............................ 707/609; 707/E17.005
(58) Field of Classification Search .............. 707/609, 707/E17.005
See application file for complete search history.

(56) References Cited

U.S. PATENT DOCUMENTS

| | | | |
|---|---|---|---|
| 6,186,535 B1* | 2/2001 | Sugiyama et al. | 280/728.2 |
| 6,360,363 B1 | 3/2002 | Moser et al. | |
| 6,367,077 B1 | 4/2002 | Brodersen et al. | |
| 6,397,385 B1 | 5/2002 | Kravitz | |
| 6,963,880 B1* | 11/2005 | Pingte et al. | 707/999.104 |
| 7,058,696 B1* | 6/2006 | Phillips et al. | 707/E17.005 |
| 7,129,853 B2* | 10/2006 | Kaplan | 726/2 |
| 7,136,903 B1* | 11/2006 | Phillips et al. | 707/E17.005 |
| 2003/0200219 A1* | 10/2003 | Wang et al. | 707/100 |
| 2004/0267744 A1* | 12/2004 | Becker et al. | 707/8 |
| 2005/0104717 A1* | 5/2005 | Kaplan | 340/5.74 |
| 2005/0138013 A1* | 6/2005 | Walker et al. | 707/3 |
| 2006/0184561 A1* | 8/2006 | Terada | 707/102 |
| 2006/0195816 A1 | 8/2006 | Grandcolas et al. | |
| 2007/0220027 A1* | 9/2007 | Richey et al. | 707/101 |
| 2007/0226685 A1 | 9/2007 | Kaakani et al. | |
| 2007/0282853 A1* | 12/2007 | Campbell et al. | 707/10 |

(Continued)

OTHER PUBLICATIONS

Besacier et al.—"Toward user Interface Virtualization: legacy Applications and Innovative Interaction Systems"—EIS'09—Proceedings of the 1st ACM SIGCHI symposium on Engineeering Interactive Computing System (EICS)—ACM Jul. 15-17, 2009 USA (pp. 157-165:1-9).*

(Continued)

*Primary Examiner* — John E Breene
*Assistant Examiner* — Anh Ly
(74) *Attorney, Agent, or Firm* — Perkins Coie LLP

(57) ABSTRACT

A method and system for converting source tables of a database of the application to target tables of a new version of the database while reducing the amount of time that the database needs to be open in single-user access mode is provided. A conversion system divides the conversion into a multi-user phase and a single-user phase. During the multi-user phase, the conversion system can perform most of the conversions while the database is opened in multi-user access mode. The conversion system stores the converted data in auxiliary tables, rather than updating the source tables. During the single-user phase, the conversion system performs the remaining conversions and copies data from the source tables and the converted data from the auxiliary tables to the target tables.

14 Claims, 12 Drawing Sheets

U.S. PATENT DOCUMENTS

2009/0187834 A1* 7/2009 Rapo et al. .................... 715/758
2009/0276449 A1* 11/2009 Syed et al. .................... 707/101
2009/0327208 A1* 12/2009 Bittner et al. .................. 706/61

OTHER PUBLICATIONS

Gary R. Voth, Charles Kindel, and Jon Fujioka (Microsoft C oporation), IEEE Interent Computing, vol. 2, Issue 2, Mar.-Apr. 1998, (pp. 41-45:1-5).*

The Solaris Zone, Jun. 9, 2008, 10 pages, http://blogs.sun.com/mhuff/entry/test [last accessed May 4, 2009].

Keep SQL Server Database Instances in Sync, 2 pages, http://www.swissql.com/products/database-compare-synchronize-tool/synchronize-sql-server-databases.html [last accessed May 4, 2009].

Sun Net TalkChat, Apr. 23, 2008, 10 pages, http://www.sun.com/emrkt/nettalk/archive/pdf/transcript_solaris_10.pdf.

Microsoft Dynamics AX 2009 Upgrade Guide, 148 pages, http://download.microsoft.com/download/8/a/8/8a808654-7931-4c2b-ab8d-f459dfe85254/AXUpgradeGuide.pdf.

Augmenting SAN Solutions through Real-Time Data Synchronization, Jan. 2003, 11 pages, http://www.pinsongroup.com/portfolio/GoldenGate%20SAN%20White%20Paper.pdf.

SAP Upgrade—Key points to Remember, Apr. 15, 2008, 8 pages, http://tknight.org/sdn/show/9136 [last accessed May 4, 2009].

Performing Bulk Copy Operations (ODBC), Apr. 2009, 2 pages, http://msdn.microsoft.com/en-us/library/ms130792.aspx [last accessed May 5, 2009].

* cited by examiner

FIG. 2 customer table 201

| record id | version | cust name | cust add | cust zip | ... |
|---|---|---|---|---|---|
| 17 | 5 | Acme | | 64301 | ... |
| 37 | 4 | brooks | | 97011 | |
| ... | | | | | |
| 68 | 2 | young | | 31540 | |
| 5 | 1 | zoro | | 13702 | | shadow customer zip table 202

| cust record id | version | cust zip |
|---|---|---|
| 17 | 5 | 64301-1055 |
| 37 | 4 | 97011-7111 |
| 68 | 2 | 31540-1111 |
| 5 | 1 | 13702-5100 |

FIG. 3 customer table 301

| record id | version | cust name | cust add | cust zip | ... |
|---|---|---|---|---|---|
| 17 | 6 | Acme | | 64302 | |
| 37 | 4 | brooks | | 97011 | |
| 105 | 1 | cauldron | | 22001 | |
| 68 | 2 | young | | 31540 | | shadow customer zip table 302

| cust record id | version | cust zip |
|---|---|---|
| 17 | 6 | 64302-2312 |
| 37 | 4 | 97011-7111 |
| 105 | 1 | 22001-9530 |
| 68 | 2 | 31540-1111 |
| 5 | 1 | 13702-5100 | script table 401

| table | script name | primary | delta |
|---|---|---|---|
| customer | zip | | |
| customer | industry code | | |
| inventory | expiration date | | |
| ... | ... | ... | ... |
| purchase order | sales person | | | copy table 402

| table | new fields | copy script | join type |
|---|---|---|---|
| customer | | | inner |
| inventory | | | inner |
| ... | ... | ... | ... |
| purchase order | | | outer |

*FIG. 4*

CONVERSION OF AN APPLICATION DATABASE TO MINIMIZE TIME IN SINGLE-USER ACCESS MODE

BACKGROUND

Enterprise Resource Planning ("ERP") software is a type of software used by many companies to plan and manage various business functions, such as budgeting, accounting, human resources, inventory, customer relationships, and so on. ERP software typically provides access to a database from which users and applications may retrieve information related to the various business functions. Users and application resources typically interact with the database via a plurality of database objects. For example, a table object may provide access to a data table while a form object may provide the code necessary for displaying a form that can be used to access data with a table. As another example, a codeunit may provide logic for manipulating the data and objects associated with the database. In addition to the above-mentioned objects, typical objects may also include reports, records, menu suites, dataports, and XMLports. These objects may be considered to be metadata because they contain information that describes the layout of forms, schema of a database table, and so on.

ERP software is typically implemented as part of an ERP system that is based on a client/server model. A server of the ERP system functions as a front end to the database of the objects and includes server components that provide server-side business logic. The clients of the ERP system include client components that interact with the server to perform functions requested by a user. When a user requests a function to be performed, the client may send a request to the server for objects that are needed to satisfy the request. For example, the client may need a form object and a table object relating to customer information to satisfy a request to update customer information. Upon receiving the request, the server then accesses the database to retrieve the objects needed to satisfy the request. Upon receiving the objects from the database, the server sends those objects to the client to allow the function requested by the user to be performed.

The database for an ERP system may contain thousands of tables with many of the tables having thousands and millions of rows. For example, a large telephone company may have millions of customers. The ERP system for such a telephone company may have a customer table with a row for each customer. The ERP system may also have a call table that includes a row for each telephone call placed by each customer. The telephone company may have multiple customer service centers with service representatives who have access to review and modify the database tables to reflect interactions with customers. Because the customers and customer service centers may be located throughout the world, the telephone company would like to have access to the ERP system 24 hours a day, seven days a week.

From time to time, the application database of an application (e.g., ERP system) may need to be converted from its current version to an upgraded version. For example, the developer of the application may develop enhanced functionality that only can be provided by modifying the schema of the database. As another example, a government entity may require certain data to be maintained by a company, which in turn requires a change to the schema of the application database. As yet another example, the data of a field may need to be converted from one format to another without changing the schema such as converting miles to kilometers. The terms conversion or upgrading of a database are used herein to refer to the changing of the schema and/or the data of application data rather than upgrading the underlying database system.

Current techniques for converting an application database typically require that the application be effectively shutdown so that users cannot use the application to change the data in the database during the conversion. Some databases may prevent users from changing the data by opening the database in single-user access mode, rather than multi-user access mode. In single-user access mode, only one user—typically a system administrator—is allowed to update the database at a time. In contrast, when the database is opened in multi-user access mode, many different users can update the database simultaneously. If a conversion requires the database to be opened in single-user access mode, then no other users can update the database at the same time. For example, all the customer service centers for a telephone company may need to be shut down during a database conversion because the database can only be opened in single-user access mode during the conversion. Since conversions on large databases can take many hours or even days, organizations are typically reluctant to convert their database to take advantage of a new functionality or to satisfy government regulations.

Although the conversion of some databases may occur while the database is opened in multi-user access mode, such a conversion is typically not desirable for several reasons. First, if a conversion process is started but fails for some reason, the database may be left in an inconsistent state. In such a case, in order to bring the database back into a consistent state, the updates to the database would need to be effectively undone by, for example, rolling back the updates or restoring an archived version of the database. Second, since multiple users may be updating the database during the conversion, the conversion process needs to recognize changes made to the database while the conversion is occurring so that the converted database includes all of the changes. Some conversion techniques may request that triggers be activated whenever an update to the database occurs so that the conversion process can ensure that the converted database reflects those updates. Such a triggering mechanism places a high overhead on ERP system, resulting in an overall slowdown of the ERP system. Third, during the conversion process, a conversion system may need to lock various tables at various times. The locking of tables may effectively lock out other users from accessing those tables, which also would result in an overall slowdown of the ERP system.

SUMMARY

A method and system for converting source tables of a database to target tables of the database while reducing the amount of time that the database needs to be open in single-user access mode is provided. A conversion system divides the conversion into a multi-user phase and a single-user phase. During the multi-user phase, the conversion system can perform most of the conversions while the database is opened in multi-user access mode. The conversion system stores the converted data in auxiliary tables, rather than updating the source tables. During the single-user phase, the conversion system performs the remaining conversions and copies data from the source tables and the converted data from the auxiliary tables to the target tables. Because the conversion system already generated some, and likely most, of the converted data for the source tables while the database was opened in multi-user access mode, the conversion system reduces the amount of time that the database needs be open in single-user access mode. Thus, the overall availability of the database is improved during the conversion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a block diagram illustrating sample data of a source table and its shadow table at the completion of the primary sub-phase of the multi-user phase.

FIG. 3 is a block diagram at that illustrates sample data of an updated source table and its shadow table at completion of the delta sub-phase of the multi-user phase.

FIG. 4 illustrates a logical organization of scripts and other information used by the conversion system in some embodiments.

DETAILED DESCRIPTION

Figure 1:
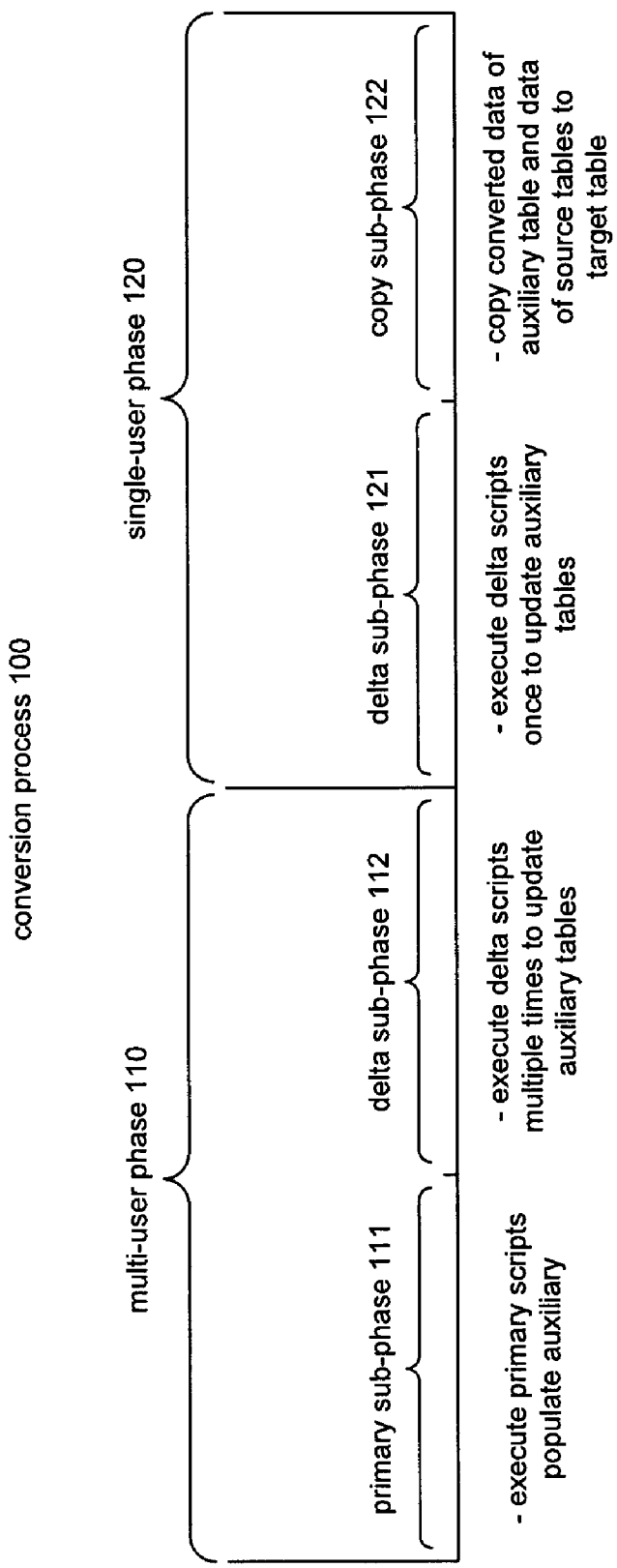
FIG. 1 is a diagram that illustrates the phases of the conversion process in some embodiments.

A method and system for converting source tables of a database to target tables of the database while reducing the amount of time that the database opened in single-user access mode is provided. In some embodiments, a conversion system divides the conversion into a multi-user phase and a single-user phase. During the multi-user phase, the conversion system can perform most of the conversions while the database is opened in multi-user access mode. The conversion system stores the converted data in auxiliary tables, rather than updating the source tables. During the single-user phase, the conversion system performs the remaining conversions and copies data from the source tables and the converted data from the auxiliary tables to target tables. Because the conversion system already generated some, and likely most, of the converted data for the source tables while the database was opened in multi-user access mode, the conversion system reduces the amount of time that the database needs to be open in single-user access mode. Thus, the overall availability of the database is improved during the conversion. Also, since the converted data is stored in auxiliary tables and the source tables were not changed, the conversion will not affect the integrity of the data in the source tables. As a result, even if the conversion fails for some reason, the source tables are still available to continue database processing—albeit with the unconverted data.

In some embodiments, the conversion system provides a primary script and a delta script for each source table that is to be converted into a target table. The primary script for a source table includes instructions for populating one or more auxiliary tables for the source table. The auxiliary tables may be created during initialization of the multi-user phase prior to execution of the primary scripts. An auxiliary table may be a shadow table or a new version table. A shadow table provides two primary functions. First, it allows data of a source table to be converted and stored while in the multi-user phase. Second, it provides a mechanism for tracking subsequent changes made by the application to the data of the source table while in the multi-user phase. A new version table has the same schema as a corresponding target table, but is created at the source database and is populated during the multi-user phase with the actual data for the corresponding target table. Because a new version table has the same schema as the corresponding target table, it can be copied directly to the target table during the single-user phase. A developer of scripts for a conversion of an application database may optionally use a new version table to effectively shift the conversion effort from the single-user phase to the multi-user phase. For example, the developer who wants to minimize the "down time" needed for the single-user phase can take advantage of the new version tables at the source database.

A shadow table includes shadow rows that correspond to source rows of the source table. A shadow table may include the converted data as a new version field that represents a new field to be included in the target table or as updated data to be included in an existing field of the target table. For example, if a ZIP code field of a source table is being converted from a five-digit ZIP code to a nine-digit ZIP code, then the primary script populates a shadow table that includes a shadow row corresponding to each source row of the source table. Each shadow row includes the nine-digit ZIP code, which may be generated from the five-digit ZIP code and a street address, for the corresponding source row. As part of the conversion, the conversion system initially executes the primary scripts to populate the shadow tables during a primary sub-phase of the multi-user phase. Since the primary scripts use shadow tables (and new version tables) to store information for the conversion, they do not need to modify the source table. As such, the primary scripts can execute while the database is opened in multi-user access mode. Because the primary scripts may take many hours or days to execute during the primary sub-phase of the multi-user phase, a source row of a source table may be updated by a user during or after the generation of its shadow table. As a result, the shadow tables may not reflect the most recent updates to the source rows of the source tables. After the primary sub-phase is complete for a source table, the conversion system may enter a delta sub-phase of the multi-user phase to update to shadow table to reflect any changes that were made to the source table. The delta script for a source table includes instructions for updating a shadow table to reflect any changes that have occurred in the source table since the shadow table was first regenerated or last updated. The conversion system may execute each delta script multiple times to keep the shadow tables as up to date as possible to reduce the time needed to complete the single-user phase.

The conversion system will eventually generate the target tables for the database and complete the conversion based on the source rows of the source tables and the shadow rows of the shadow tables. To complete the conversion, the conversion system enters the single-user phase in which the database is opened in single-user access mode. The single-user phase has a delta sub-phase and copy sub-phase. During the delta sub-phase, the conversion system executes each delta script while the database is opened in single-user access mode. The execution of the delta scripts ensures that the auxiliary (i.e., shadow and new version) tables are up to date with their source tables. Moreover, since the database is opened in single-user access mode, the source tables cannot be further updated, thus ensuring that the auxiliary tables continue to be up to date with the source tables. After the conversion system executes all the delta scripts for a source table, it sets a flag for entry into the copy sub-phase of the single-user phase for that source table, which may overlap the delta sub-phase of another source table. During the copy sub-phase for a source table, the conversion system adds new source rows to the target table based on the information of the source rows and the corresponding shadow rows and may copy rows from the source tables that were not part of the conversion. The copy sub-phase also copies new version tables and source tables that are not being converted (e.g., "non-affected source tables") directly to corresponding target tables. When the copy sub-phase is complete for all the source tables, the conversion is complete and the target tables compose the converted database.

As discussed above, the conversion system may track updates to a source table since the corresponding shadow table was last updated. To track these updates, the primary scripts generate shadow tables that each includes a record identifier field and a version field. Each source row of a source table includes a unique record identifier that is stored in a record identifier field of the source table. The record identifier field of a shadow table thus functions as a foreign key to the corresponding source table. The conversion system uses the record identifier fields to identify corresponding records of the source tables and the shadow tables. When the application updates a source row of a source table, it modifies the value of the version field of that source row to indicate that a new version of that source row has been generated. For example, whenever the application updates a source row, it may increment the version field for that source row to indicate the new version. The conversion system includes a version field in the shadow rows of the shadow tables to help track the source rows of the source tables that have been updated since the corresponding shadow rows of the shadow tables were last updated. The conversion system tracks updates to a source table that add a new source row or modify an existing source row of the source table. To identify source rows that have been modified since the corresponding shadow row was modified, the conversion system joins the source rows of the source table with the shadow rows of the shadow table based on the record identifier fields and having a constraint that the version fields are different. The resulting join table will contain a row for each source row that has been modified since the corresponding shadow row was last modified. To identify source rows that have been added since the corresponding shadow table was last updated, the conversion system may join the source table and the shadow table based on the record identifier fields and having a constraint that there is no corresponding record in the corresponding shadow table. The conversion system does not need to track source rows that have been deleted since the last update to the corresponding shadow rows as these deleted rows are automatically removed by a join performed during the copy sub-phase of the single-user phase.

To complete the conversion during the single-user phase, the conversion system opens the database in a single-user mode, executes each delta script, and then copies data from the source and shadow tables to the target tables of the database. The conversion system executes each delta script in the delta sub-phase so that the auxiliary tables are updated to reflect the last updates that have been made to the source tables. After the delta script for a source table has been executed, the conversion system enters the copy sub-phase for that source table and may generate a join between the source table and its shadow table based on the record identifier field. If the join is an inner join, the resulting join includes a row for each shadow row that has a corresponding source row. If a source row of the source table was deleted after the shadow table was updated to include a shadow row corresponding to that now-deleted source row, the join will not include a row corresponding to the deleted source row. The conversion system then adds a row to the target table for each row of the join, which has excluded the shadow rows whose corresponding source rows have been deleted.

In some embodiments, the conversion system may allow multiple primary scripts and corresponding delta scripts for a source table. Each primary script for a source table may populate a different shadow or new version table. For example, one primary script may create a shadow table that contains a converted ZIP code field, and another primary script may create a shadow table that contains a new industry code field for the source table. Although a single shadow table and a single primary script may be sufficient to perform the conversion needed for the new ZIP code field value and the new industry code field, it may simplify the generating of primary scripts to allow multiple shadow tables for different types of conversion. For example, if many tables need to have the same conversion (e.g., ZIP code conversion for a customer table, supplier table, employee table, and so on), then a single script can be defined and reused for each table with the table name being an input parameter of the script. During the copy sub-phase of the single-user phase, the conversion system may generate an aggregate join for a source table and all of its shadow tables resulting in a join table that has a row for each source table with the appropriate fields derived from each shadow table.

In some embodiments, it might not be desirable or possible to perform all types of conversion during the multi-user phase. For example, some of the conversions may be so computationally expensive that when the database is opened in multi-user access mode the response time for other users would be prohibitively long. As another example, some conversions may require access to multiple tables to generate the data needed for the conversion. As a result, it can be very difficult to identify when a shadow row needs to be updated. If it is hard to tell when a shadow row needs to be updated the shadow table will not be effectively updated to reflect the updates that have occurred since the shadow table was originally generated. To overcome these difficulties, the conversion system may allow some primary scripts to be executed during the single-user phase, rather than during the multi-user phase. In addition, there may be some conversions that can more efficiently be performed during the copy sub-phase of the single-user phase. In particular, when the join is performed between a source table and its shadow table, certain computations can be performed at that point efficiently because the rows of the join are already loaded into main memory. In such a case, the conversion system may allow copy scripts to be performed during the copy sub-phase of the single-user phase. These copy scripts may be effectively implemented as part of the SQL statement that effects the joining and copying of the rows. The conversion system may allow developers of scripts to specify an arbitrary function to be used when selecting data for a target table. For example, a developer may provide a function for converting miles to kilometers or francs to euros during the copy sub-phase. In addition, each source table may have an associated fields list that specifies the fields of the joined rows that are to be stored in the target table.

FIG. 1 is a diagram that illustrates the phases of the conversion process in some embodiments. A conversion process 100 is divided into a multi-user phase 110 and a single-user phase 120. During the multi-user phase, the conversion system opens the application database in multi-user access mode, which means that multiple users may be accessing the application database for updates. During the multi-user phase, the scripts may lock records of the database on a record-by-record basis to minimize conflicts with and waiting by the application. During the single-user phase the conversion system opens the database in single-user access mode, which means that only the conversion system is accessing the database for updates (although not actually updating the source tables), but other users may be accessing the database in a read-only mode. During the single-user phase, the scripts may lock a set of records (e.g., an entire table) at a time since conflicts with the application cannot occur. The multi-user phase is divided into a primary sub-phase 111 and a delta sub-phase 112 and may have an initialization sub-phase for creating auxiliary tables (not shown).

In some embodiments, the conversion system may allow changes by the application to source tables to be tracked using mechanisms other than a shadow table. The conversion system may allow changes to be tracked using log files or triggers. The application can log all changes to a source table to a log file using, for example, conventional logging mechanisms of a database system. A delta script can join the records of the log file for a source table to an auxiliary table to identify the changes. Although executing a delta script based on triggers generated when a row of a source table is updated may have a relatively high overhead, in some instances the use of triggers may have less overhead than use of a shadow table. For example, if a source table is very large, then the join needed between the source table and its shadow table each time its delta script is executed may have a high overhead. Thus, if the large table is modified only infrequently, then the per trigger overhead may result in less overall overhead. During the primary sub-phase, the conversion system executes each primary script to populate the auxiliary tables. During the delta sub-phase, the conversion system may execute delta scripts multiple times to update the auxiliary tables based on recent changes to the source tables. The single-user phase is divided into a delta sub-phase 121 and a copy sub-phase 122. During the delta sub-phase, the conversion system executes each delta script once to generate a final update to the shadow tables. During the copy sub-phase, the conversion system generates a join between the source tables and their shadow tables and copies converted data and unconverted data of the join to the target tables.

FIG. 2 is a block diagram illustrating sample data of a source table and its shadow table at the completion of the primary sub-phase of the multi-user phase. A customer table 201 is a source table that contains a row for each customer and includes a record identifier field, a version field, a customer name field, a customer address field, and a customer ZIP field, and so on. The first row of the customer table indicates that the record identifier is 17, the version is 5, the customer name is "Acme," and the customer ZIP field is 64301. A shadow customer ZIP table 202 contains an entry for each row of the customer table with a customer record identifier field, a version field, and a customer ZIP field. The customer record identifier field is a foreign key that identifies a corresponding source row in the customer table. For example, the first row of the shadow customer ZIP table includes a customer record identifier of 17 which corresponds to the first row of the customer table. In this example, the customer ZIP field of the shadow customer ZIP table includes the nine-digit zip value corresponding to the customer ZIP field.

FIG. 3 is a block diagram at that illustrates sample data of an updated source table and its shadow table at completion of the delta sub-phase of the multi-user phase. A customer table 301 corresponds to customer table 201 with three updates. The first update is the addition of the row with record identifier 105 corresponding to the customer name, "cauldron." The second update is the modification of the row with record identifier 17 in which the customer ZIP field has been corrected to be 64302, rather than 64301. The third update is the deletion of the row with the record identifier of 5. A shadow customer ZIP table 302 illustrates the corresponding changes to the shadow table. The row corresponding to customer record identifier 17 has been updated to reflect the new version of the corresponding row in the customer table and the updated, and nine-digit, ZIP field. The row with the customer record identifier of 105 has been newly added to the shadow table. However, the row with the customer record identifier of 5 is still in the shadow table, even though the source table includes no corresponding source row. As discussed above, the deletion of source rows from a source table is accounted for during the copy sub-phase of the single-user phase.

FIG. 4 illustrates a logical organization of scripts and other information used by the conversion system in some embodiments. A script table 401 defines the scripts for the conversion process. Each row of the table includes a table name field, a script name field, a primary field, and a delta field. The table name field contains the name of a source table; the script name field contains the name of the script; and the primary field contains a reference to the primary script. The delta field contains a reference to the corresponding delta script. A copy table 402 contains a row for each source table. Each row includes a table name field, a new fields field, a copy script field, and a join type field. The table name field contains the name of the associated source table; the new fields field identifies the fields that are to be copied during the copy sub-phase for that source table; the copy script field specifies any computations that may be performed during the copy sub-phase for that source table; and the join type field identifies the type of the join used in the copy sub-phase. In general, the join type field is inner because a shadow table will contain a shadow row for each current source row and deleted source row. In some embodiments, the shadow table may contain a shadow row for only a subset of the source rows. For example, the conversion process may change the currency type only for suppliers in certain countries, i.e., as changing the currency of suppliers in France from the franc to the euro. In such a case, the shadow table may have shadow rows for only those suppliers in France. During the copy sub-phase, an outer join will result in a join table with a row for each supplier in either the source table or the shadow table. However, the use of an outer join may result in shadow rows of suppliers in France, who were actually deleted from the source table after the shadow table was created, still being included in the resulting join table. In such a case, the removal of such shadow rows may be handled as a special case.

Figure 5:
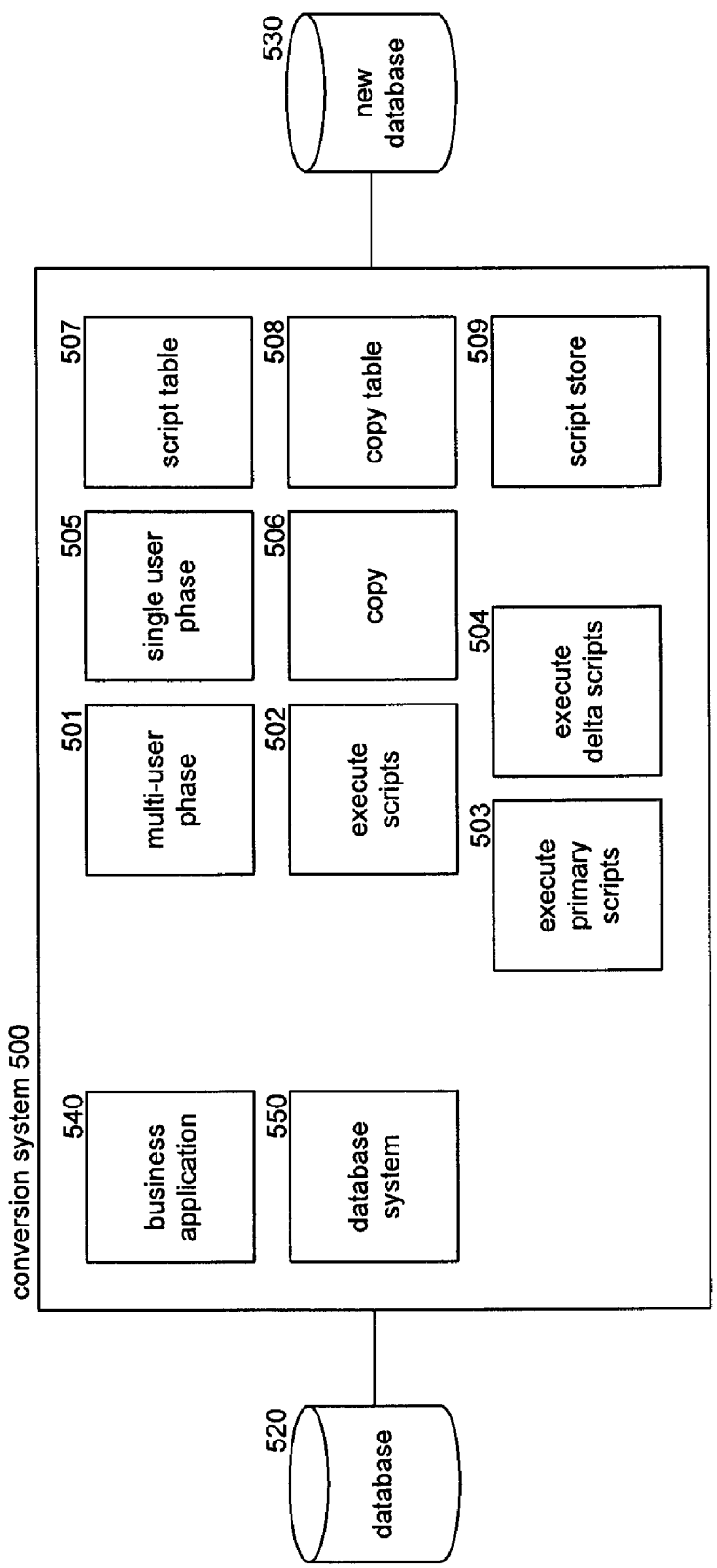
FIG. 5 is a block diagram that illustrates components of the conversion system in some embodiments.

FIG. 5 is a block diagram that illustrates components of the conversion system in some embodiments. A conversion system 500 may perform the conversion from a database 520 to new database 530. The conversion system may be executed on a computer system that includes a business application 540 and a database system 550. The business application invokes the database system to access the database 520. The conversion system includes a multi-user phase component 501, an execute scripts component 502, an execute primary scripts component 503, an execute delta scripts component 504, a single-user phase component 505, and a copy component 506. The conversion system also includes a script table 507, a copy table 508, and a script store 509. The multi-user phase component controls the processing during the multi-user phase by invoking the execute scripts component, which in turn invokes the execute primary scripts component and the execute delta scripts component. The single-user phase component controls the processing during the single-user phase by invoking the execute delta scripts component and the copy component.

The computing device on which the conversion system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the conversion system. In addition, the data structures and message structures may be transmitted via a data transmission medium, such as a signal on a communications link. Various communications links may be used, such as the Internet, a local area network, a wide area network, or a point-to-point dial-up connection.

The conversion system may be implemented in and/or used by various operating environments. The operating environment described herein is only one example of a suitable operating environment and is not intended to suggest any limitation as to the scope of use or functionality of the conversion system. Other well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The conversion system may be described in the general context of computer-executable instructions, such as program modules, stored in a storage device and executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In some embodiments, the conversion system may distribute its processing among multiple computer systems that are connected to the existing database. For example, the primary scripts and delta scripts for different tables can be executed by different computer systems. Moreover, the execution of a single script may be divided into multiple computer systems or multiple processors of a single computer system. Similarly, the processing of the copy sub-phase can also be divided among different computer systems.

Figure 6:
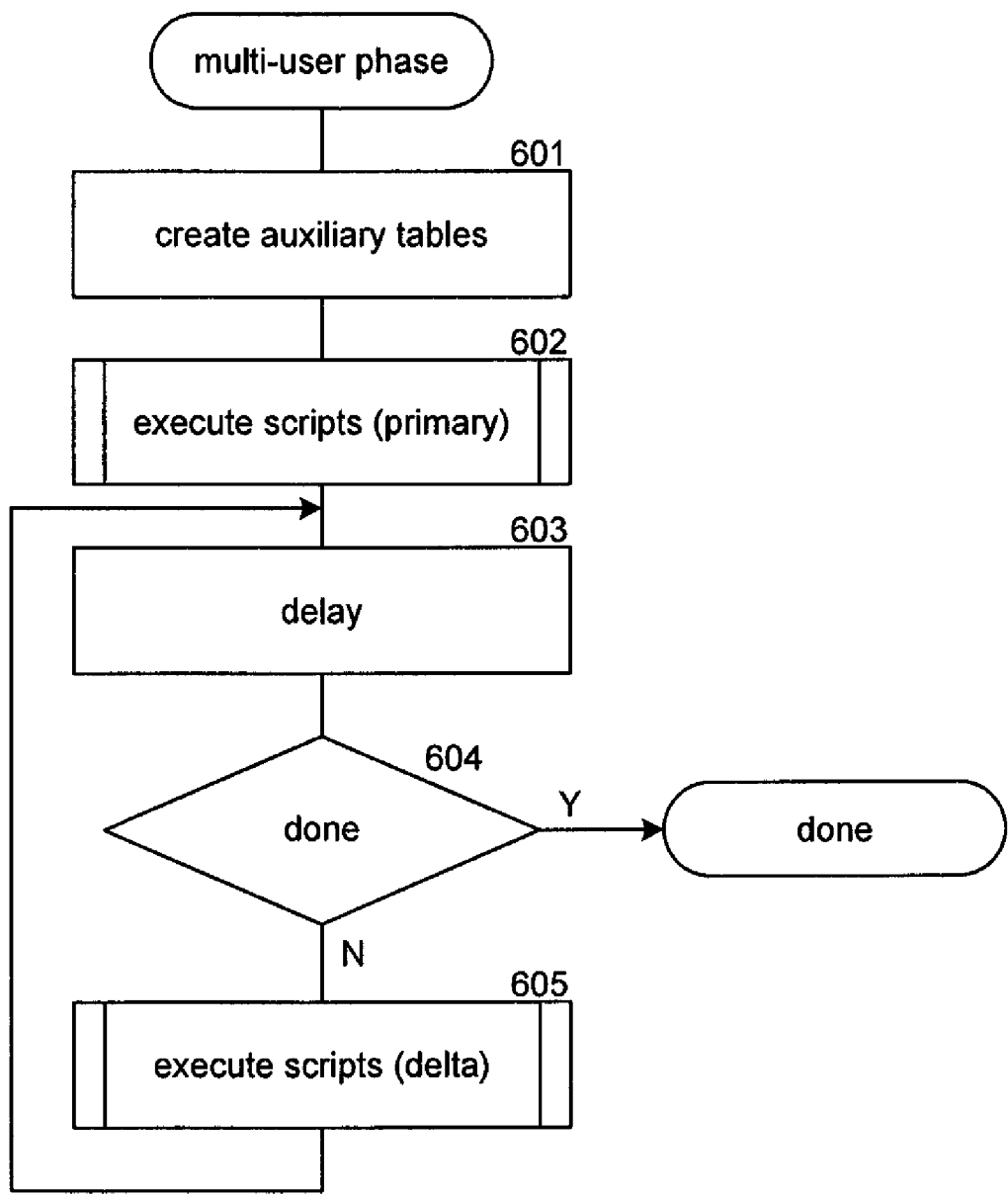
FIG. 6 is a flow diagram that illustrates the processing of the multi-user phase component in some embodiments.

FIG. 6 is a flow diagram that illustrates the processing of the multi-user phase component in some embodiments. The component controls the conversion processing during the multi-user phase. In block 601, the component creates the auxiliary tables. In block 602, the component invokes the execute scripts component, passing it an indication that the primary scripts are to be executed as the primary sub-phase. In blocks 603-605, the component loops, executing the delta scripts during the delta sub-phase. In block 603, the component may delay until the designated time to next execute the delta scripts. In decision block 604, if the delta sub-phase is complete, then the component completes, else the component continues at block 605. In block 605, the component invokes the execute scripts component, passing it an indication of the delta scripts. The component then loops to block 603 to wait for the next designated time.

Figure 7:
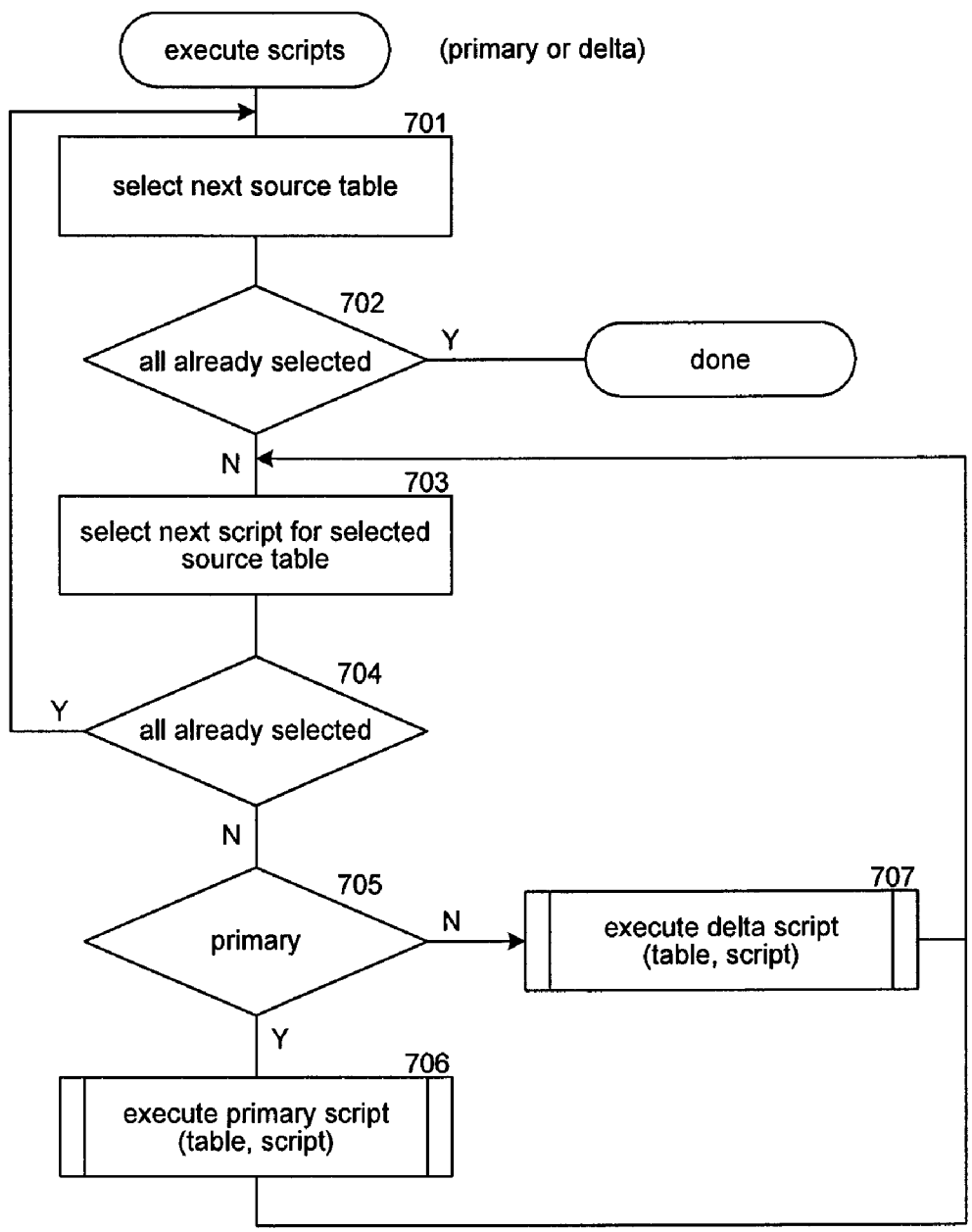
FIG. 7 is a flow diagram that illustrates the processing of the execute scripts component in some embodiments.

FIG. 7 is a flow diagram that illustrates the processing of the execute scripts component in some embodiments. The component is passed an indication of whether the primary or delta scripts should be executed. In block 701, the component selects the next source table of the database to be converted. In decision block 702, if all the source tables have already been selected, then the component completes, else the component continues at block 703. In block 703, the component selects the next script that has been defined for the selected source table. In decision block 704, if all such scripts have already been selected, then the component loops to block 701 to select the next source table, else the component continues at decision block 705. In decision block 705, if the primary script has been designated, then the component continues at block 706, else the component continues at block 707. In block 706, the component invokes the execute primary script component, passing it an indication of the selected source table and the selected script. In block 707, the component invokes the execute delta script component, passing it an indication of the selected source table and the selected script. The component then loops to block 703 to select the next script for the selected source table.

Figure 8:
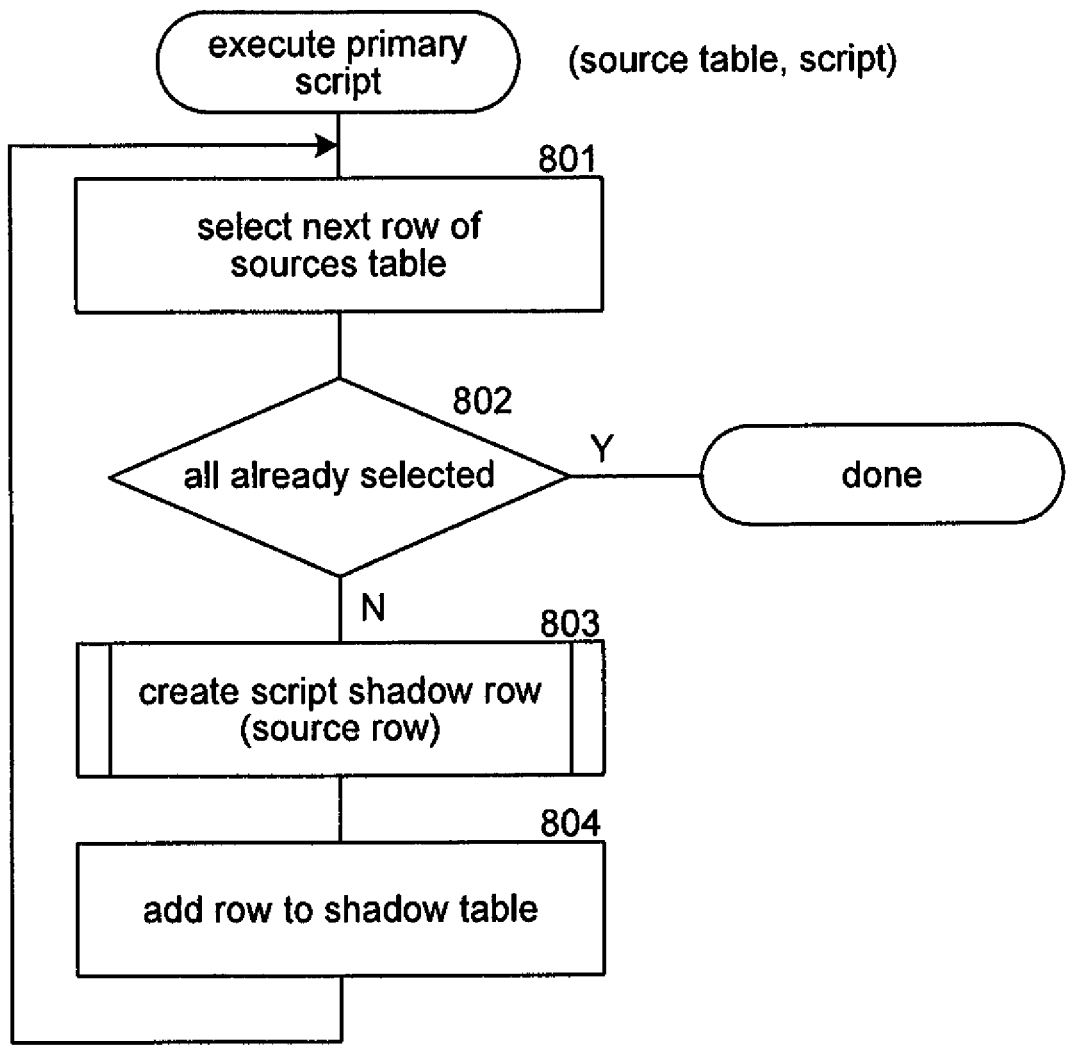
FIG. 8 is a flow diagram that illustrates the processing of the execute primary script component in some embodiments.

FIG. 8 is a flow diagram that illustrates the processing of the execute primary script component in some embodiments. The component is passed an indication of a source table and a script for the source table and executes the primary script for that script. In blocks 801-804, the component loops, adding shadow rows to the shadow table. In block 801, the component selects the next row of the source table. In decision block 802, if all the rows of the source table have already been selected, then the component completes, else the component continues at block 803. In block 803, the component invokes the create script shadow row component to generate the shadow row for the passed script. For example, if the passed source table is the customer table and the passed script is the ZIP script, then the component invokes the create ZIP shadow row component for the customer table. In block 804, the component adds the newly created shadow row to the shadow table and then loops to block 801 to select the next source row of the source table. One skilled in the art will appreciate that the logical processing indicated in this and other flow diagrams may be specified declaratively by a SQL statement rather than imperatively by a script. One skilled in the art will also appreciate that this flow diagram can be adapted to accommodate new version tables.

Figure 9:
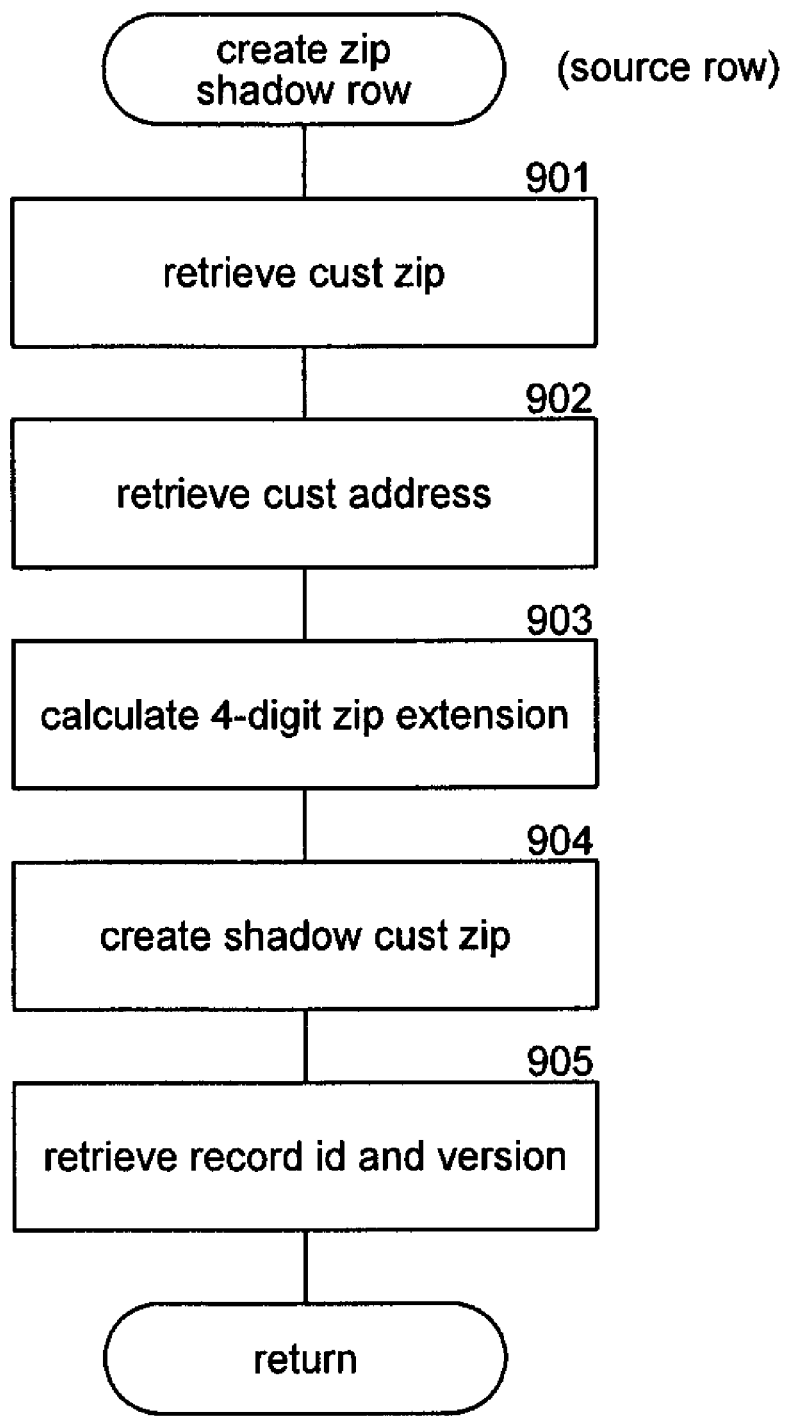
FIG. 9 is a flow diagram of the create ZIP shadow row component for the customer table.

FIG. 9 is a flow diagram of the create ZIP shadow row component for the customer table. The component is passed a source row. In block 901, the component retrieves the customer ZIP field from the source row. In block 902, the component retrieves the customer address field from the source row. In block 903, the component calculates the four-digit ZIP extension for the customer ZIP field and the customer address field. In block 904, the component creates a nine-digit shadow customer ZIP field. In block 905, the component retrieves the record identifier and version of the source row and then returns the shadow row.

Figure 10:
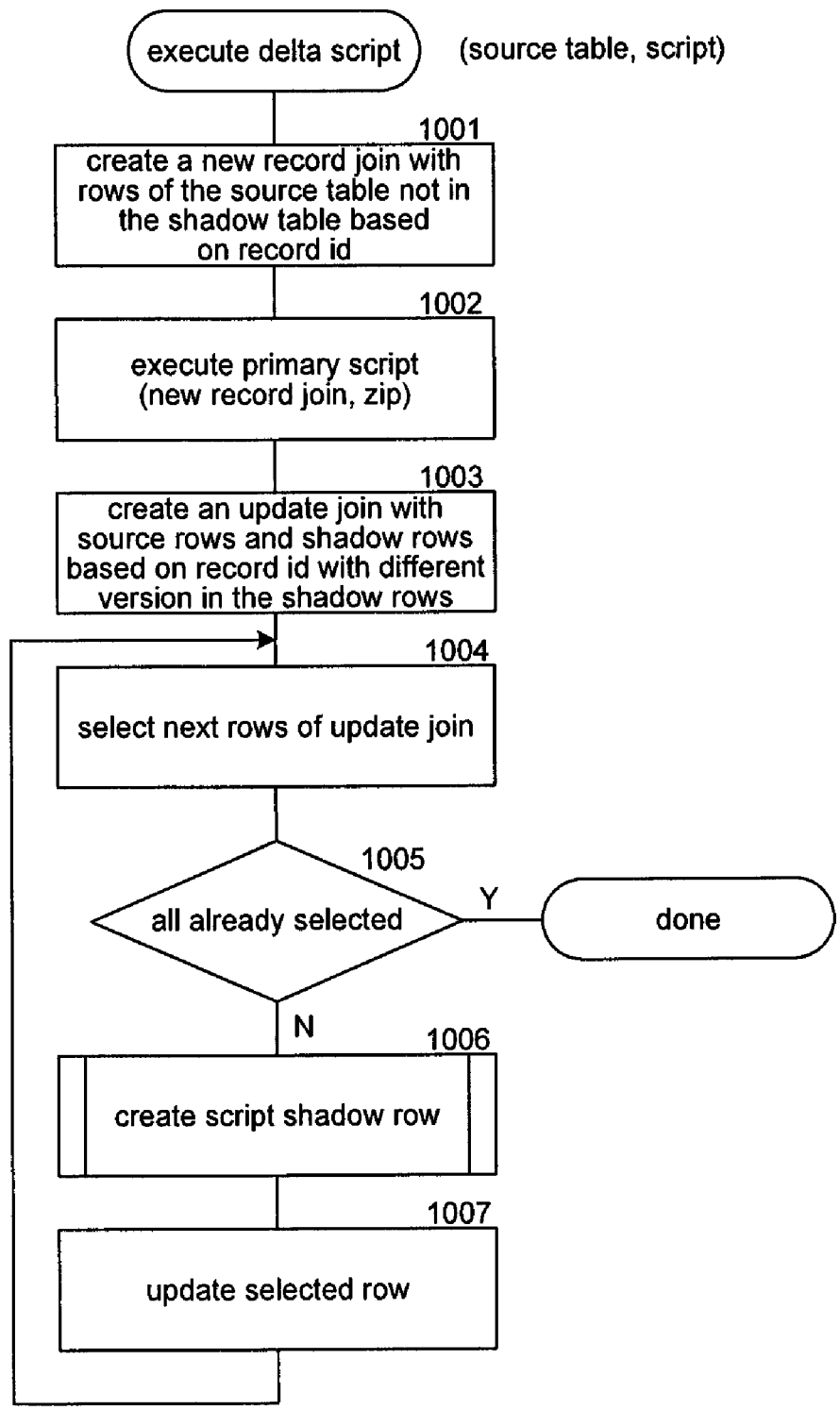
FIG. 10 is a flow diagram that illustrates the processing of an execute delta script component in some embodiments.

FIG. 10 is a flow diagram that illustrates the processing of an execute delta script component in some embodiments. The component is passed an indication of a source table and a script and performs the delta script for that source table and script. In block 1001, the component creates a new record join to identify rows of the source table that are not currently in the shadow table. In block 1002, the component invokes the execute primary script, passing it an indication of the new record join and an indication of the passed script to add new shadow rows to the shadow table. In block 1003, the component creates an update join with rows of the source table that have been updated since the shadow table was last updated. In block 1004, the component selects the next row of the update join. In decision block 1005, if all the rows have already been selected, then the component completes, else the component continues at block 1006. In block 1006, the component invokes the create script for the shadow row corresponding to the passed script and source table. In block 1007, the component updates the selected row and then loops to block 1004 select the next row of the update join. One skilled in the art will also appreciate that this flow diagram can be adapted to accommodate new version tables.

Figure 11:
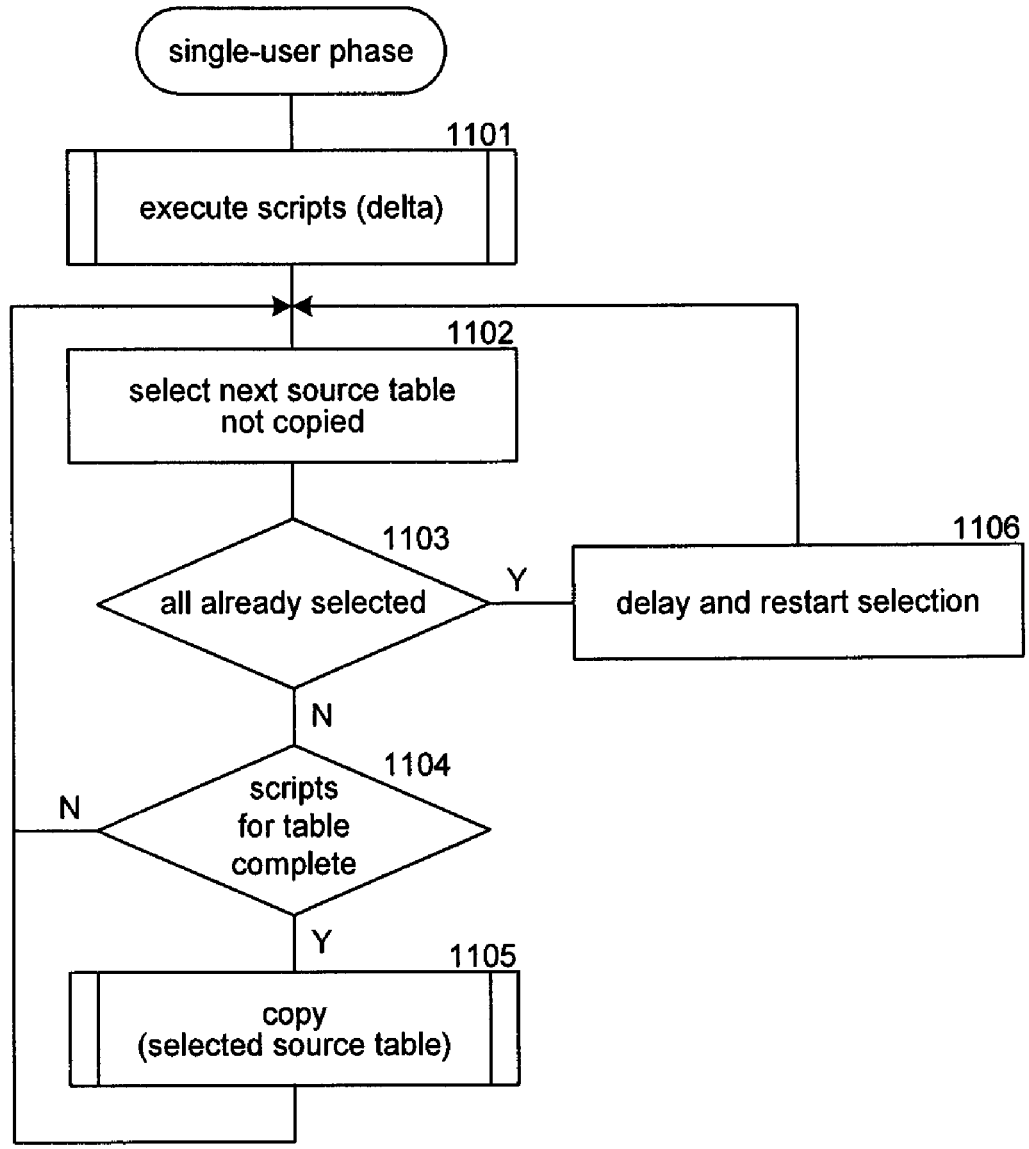
FIG. 11 is a flow diagram that illustrates the processing of a single-user phase component in some embodiments.

FIG. 11 is a flow diagram that illustrates the processing of a single-user phase component in some embodiments. In block 1101, the component invokes the execute scripts component, passing it an indication of the delta scripts to effect the performance of the delta sub-phase of the single-user phase. In blocks 1102-1106, the component loops, implementing the copy sub-phase of the single-user phase. In block 1102, the component selects the next source table that has not yet been copied. In decision block 1103, if all such source tables have already been selected, then the component continues at block 1106, else the component continues at decision block 1104. In decision block 1104, if the all scripts for the table are complete, then the component continues at block 1105, else the component loops to block 1102 to select the next source table that has not yet been copied. In block 1105, the component invokes the copy component, passing it the selected source table and then loops to block 1102 to select the next source table that has not yet been copied. In some embodiments, the component may set a flag indicating that a source table is ready to be copied. The copying of source tables can then be performed in parallel with the executing of delta scripts of the source tables. In block 1106, the component delays and then restarts the selection of the source tables that have not yet been copied.

Figure 12:
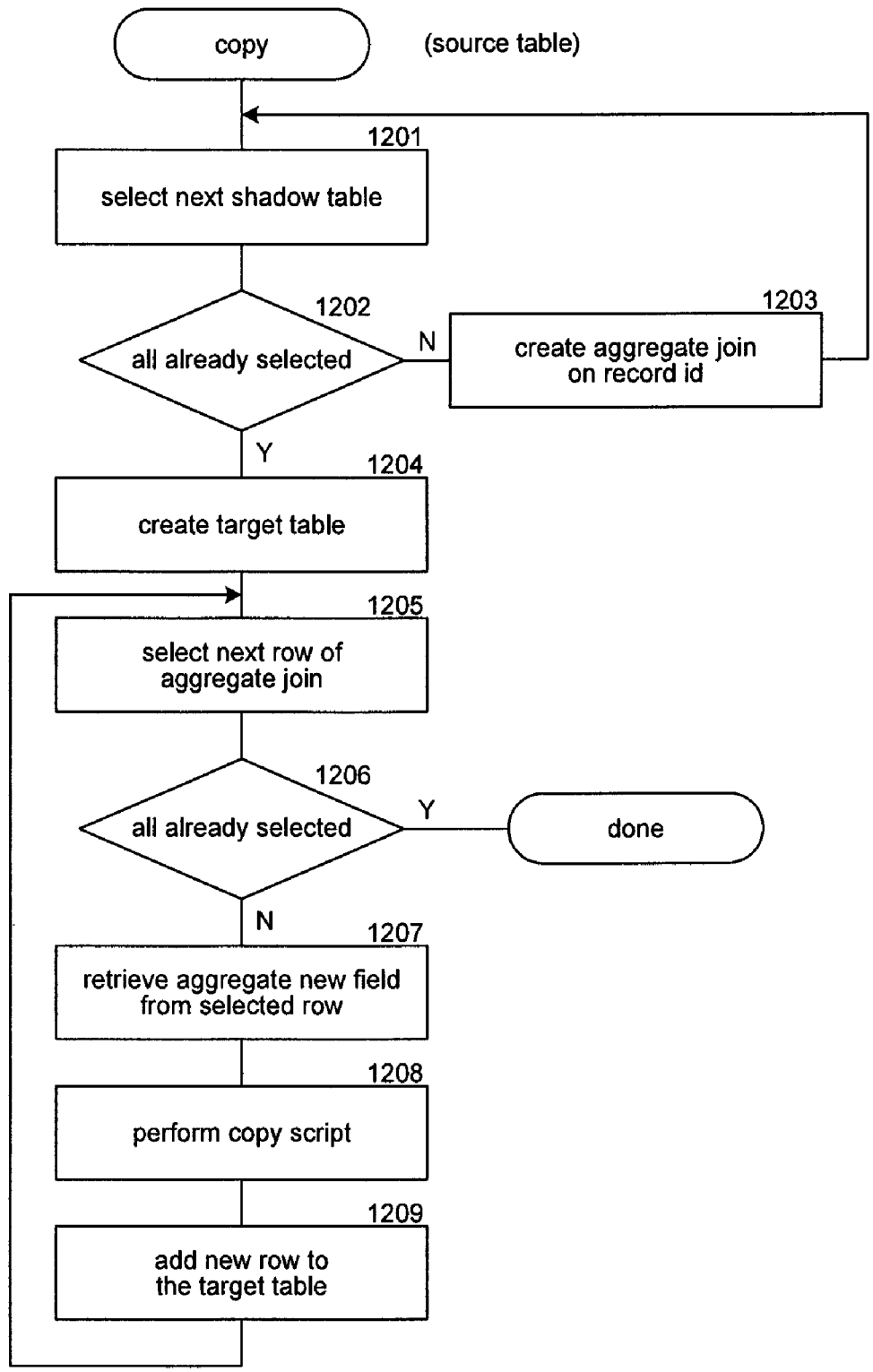
FIG. 12 is a flow diagram that illustrates the processing of a copy component in some embodiments.

FIG. 12 is a flow diagram that illustrates the processing of a copy component in some embodiments. The component is passed an indication of a source table and copies the converted data and unconverted data from the shadow table and the source table to the target table. In blocks 1201-1203, the component creates an aggregate join of the source table and its shadow table, which may be implemented in a single SQL statement. In block 1201, the component selects the next shadow table of the source table. In decision block 1202, if all the shadow tables have already been selected, then the component continues at block 1204, else the component continues at block 1203. In block 1203, the component creates an aggregate join based on the record identifier of the selected shadow table and the source table and then loops to block 1201 to select the next shadow table. In block 1204, the component creates the target table. In blocks 1205-1209, the component loops, adding rows to the target table. In block 1205, the component selects the next row of the aggregate join. In decision block 1206, if all the rows have already been selected, then the component completes, else the component continues at block 1207. In block 1207, the component retrieves the identification of the new fields to be included in the new row. In block 1208, the component performs any copy script conversions. In block 1209, the component adds the new row to the target table and loops to block 1205 to select the next row of the aggregate join.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-implemented method performed by a computing system to generate target tables that are new versions of source tables of a database of an application, the method comprising:

providing scripts for the source tables of the database, a script associated with a source table for generating a shadow table of the source table, the shadow table including shadow rows for source rows of the source table, each shadow row including a record identifier field and a version field of the source row and a new version field, the record identifier field uniquely identifying a corresponding source row of the source table, the version field identifying an update to a source row that is already reflected in the corresponding shadow row, the new version field representing an update to the source row for the source table;

while the database is opened in a multi-user access mode, for source tables, executing a script associated with the source table to generate a shadow table for the source table; and after the shadow table for the source table has been generated, updating by the application of the source table, the updating being selected from the group consisting of modifying a field of a source row of the source table, adding a source row to the source table, and deleting a source row from the source table;

while the database is opened in a single-user access mode, for source tables, executing a script associated with the source table to update the shadow table to reflect updates made to the source table, the reflected updates including updates selected from the group consisting of modifying a field of a source row of the source table and adding a source row to the source table, the updates being identified based on source rows and shadow rows that have the same record identifier fields but different version fields and source rows that have no corresponding shadow rows with the same record identifier field; and after the shadow table of the source table has been updated to reflect updates to the source table, adding by the application to a target table a new source row for each source row of the source table, the new source row including the new version field of a corresponding shadow row with the same record identifier field;

wherein a script for a source table updates a shadow table by performing a join between the source table and the shadow table to identify source rows for which the shadow table contains no corresponding shadow rows with the same record identifier fields; and wherein the adding to the target table a new source row for each source row of the source table is performed by joining the source rows of the source table to the shadow rows of the shadow table based on the record identifier fields.

2. The method of claim 1 wherein a script associated with a source table updates a shadow table by performing a join between the source table and the shadow table with the same record identifier field with a constraint that the version fields are not equal.

3. The method of claim 1 wherein the joining is an inner join so that the join includes no shadow rows for which the source table has no source row with the same record identifier field.

4. The method of claim 1 wherein a source table has multiple scripts and that each script generates a different shadow table for the source table.

5. The method of claim 4 wherein the adding to the target table a new source row is performed by a combined join of the source rows of the source table to the shadow rows of the different shadow tables based on the record identifier fields.

6. The method of claim 1 wherein, after the shadow table for the source table has been populated, updating of the source table when the database is opened in multi-user access mode.

7. The method of claim 1 wherein a script executed to populate a shadow table is a primary script, and a script executed to update a shadow table is a delta script.

8. A computer-readable storage medium containing computer-executable instructions for converting source tables of a database of an application to target tables of a new version of the database, by a method comprising:
providing scripts for source tables of the database, each script generating a shadow table of the source table, each row of a shadow table including a new version field representing a source row for the new version of the source table;
while the database is opened in a multi-user access mode,
for each source table, executing the script associated with the source table to populate a shadow table for the source table; and
after the shadow table for a source table has been populated, updating by the application of the source table; and
while the database is opened in a single-user access mode,
for each source table that has been updated by the application since the shadow table was populated,
executing a script associated the source table to update the shadow table to reflect updates by the application to the source table that have occurred since the shadow table was populated; and
after the shadow table of the source table has been updated to reflect the updates by the application to the source table, adding new source rows to the target table based on the source rows of the source table and the shadow rows of the shadow table,
wherein the executed scripts do not modify the source tables and the shadow tables are populated when the database is opened in multi-user access mode to reduce the amount of time that the database needs to be open in the single-user access mode during conversion of the source tables;
wherein the provided scripts associated with a source table include a primary script that populates the shadow table and a delta script that updates the shadow table; and
wherein the delta scripts are executed multiple times while the database is opened in multi-user mode to reduce the amount of time that the database needs to be open in single-user mode.

9. The computer-readable storage medium of claim 8 wherein the shadow table include a record identifier field that uniquely identifies a corresponding source row and a version field that indicates the version of the corresponding source row that has been reflected in the shadow row.

10. The computer-readable storage medium of claim 9 wherein the script for updating the shadow table includes identifying updated source rows by performing a join of the source rows and the shadow rows based on record identifier fields being the same and the version fields being different.

11. The computer-readable storage medium of claim 9 wherein the script for updating the shadow table includes identifying new source rows by performing a join of the source rows and the shadow rows based on a record identifier field of a source row having no shadow row with a matching record identifier field.

12. The computer-readable storage medium of claim 8 wherein the execution of the scripts is distributed across multiple computing devices with access to the database.

13. The computer-readable storage medium of claim 8 wherein the adding of new source rows to a target table includes generating a field to be added to the new source rows.

14. A computing system for converting source tables of a database of an application to target tables of a new version of the database, comprising:
a memory storing:
primary scripts and delta scripts for source tables of the database, a primary script for generating an auxiliary table of the source table and a delta script for updating the auxiliary table to reflect changes by the application to the source table that were made since the auxiliary table was populated or last updated;
computer executable instructions that implement:
a component that, while the database is opened in a multi-user access mode, executes the primary scripts to populate the auxiliary tables and executes the delta scripts to update the auxiliary tables; and
a component that, while the database is opened in a single-user access mode, executes the delta scripts to update the auxiliary tables and adds new source rows to the target table based on the rows of the auxiliary table,
wherein the executed primary scripts and delta scripts do not modify the source tables, and the auxiliary tables are populated when the database is opened in multi-user access mode to reduce the amount of time that the database needs to be open in the single-user access mode during conversion of the source tables;
wherein the auxiliary tables include a record identifier field for each shadow row that uniquely identifies a corresponding source row of the source table; and
wherein the auxiliary tables include a version field for each row that identifies the version of the corresponding source row reflected in updates to the row; and
a processor for executing the computer-executable instructions stored in the memory.

* * * * *